(12) United States Patent
Karlsen et al.

(10) Patent No.: US 9,505,946 B2
(45) Date of Patent: Nov. 29, 2016

(54) POWDER COATING

(75) Inventors: Bjorn Karlsen, Larvik (NO); Helge Hoff, Larvik (NO); Christer Lorentz Opstad, Sandefjord (NO)

(73) Assignee: Jotun Powder Coatings (N) AS, Larvik (NO)

( * ) Notice: Subject to any disclaimer, the term of this patent is extended or adjusted under 35 U.S.C. 154(b) by 1177 days.

(21) Appl. No.: 13/985,233

(22) PCT Filed: Feb. 13, 2012

(86) PCT No.: PCT/EP2012/052404
§ 371 (c)(1),
(2), (4) Date: Jul. 16, 2014

(87) PCT Pub. No.: WO2012/110451
PCT Pub. Date: Aug. 23, 2012

(65) Prior Publication Data
US 2014/0364540 A1    Dec. 11, 2014

(30) Foreign Application Priority Data
Feb. 14, 2011   (EP) .................................... 11154396

(51) Int. Cl.
| | | |
|---|---|---|
| *B32B 27/38* | (2006.01) | |
| *B32B 27/26* | (2006.01) | |
| *B32B 27/36* | (2006.01) | |
| *B05D 1/06* | (2006.01) | |
| *B05D 1/12* | (2006.01) | |
| *B05D 3/02* | (2006.01) | |
| *B05D 3/06* | (2006.01) | |
| *C09D 5/03* | (2006.01) | |
| *C09D 163/00* | (2006.01) | |
| *C09D 167/02* | (2006.01) | |
| *C08B 37/16* | (2006.01) | |
| *C09D 133/00* | (2006.01) | |

(52) U.S. Cl.
CPC ......... *C09D 163/00* (2013.01); *C08B 37/0012* (2013.01); *C08B 37/0015* (2013.01); *C09D 133/00* (2013.01)

(58) Field of Classification Search
None
See application file for complete search history.

(56) References Cited

U.S. PATENT DOCUMENTS

| | | | |
|---|---|---|---|
| 6,541,544 B1 * | 4/2003 | Hart ..................... | C09D 133/00 523/409 |
| 8,017,297 B1 * | 9/2011 | Davis .................... | B05D 7/536 156/230 |
| 2002/0004557 A1 * | 1/2002 | Hart ....................... | C08G 59/18 525/80 |
| 2004/0230008 A1 | 11/2004 | Correll et al. | |
| 2004/0236037 A1 | 11/2004 | December et al. | |
| 2006/0292374 A1 | 12/2006 | Chasser et al. | |
| 2008/0188626 A1 | 8/2008 | Verghese et al. | |
| 2010/0237292 A1 | 9/2010 | Gan et al. | |

FOREIGN PATENT DOCUMENTS

| | | |
|---|---|---|
| CN | 101942262 A | 1/2011 |
| DE | 102006055081 | 5/2008 |
| EP | 0806445 | 4/1997 |
| EP | 0916709 | 5/1999 |
| EP | 1184431 | 3/2002 |

OTHER PUBLICATIONS

International Search Report dated Mar. 20, 2012 for application No. PCT/EP2012/052404.

* cited by examiner

*Primary Examiner* — Michael J Feely
(74) *Attorney, Agent, or Firm* — Gardner Groff Greenwald & Villanueva, PC

(57) ABSTRACT

A particulate coating composition, preferably a powder coating composition comprising at least one epoxy containing compound, at least one polycarboxyl polymer, at least one organic Lewis acid and at least one organic Lewis base.

18 Claims, No Drawings

POWDER COATING

IN THE CROSS-REFERENCE TO RELATED APPLICATIONS

This application is a U.S. national phase application under 35 USC 371 of international application number PCT/EP2012/052404, filed Feb. 13, 2012, which claims priority to European Application No. 11154396.3, filed Feb. 14, 2011, which is hereby incorporated herein by reference in its entirety for all purposes.

This invention relates to powder coatings and in particular to a powder coating formed with both Lewis acid and Lewis base components. The invention also relates to the use of the powder coating to coat a substrate as well as to a process for the manufacture of the powder coating, a process for curing the coating and uses of the coating.

Traditionally, coating powders have been made by the extrusion of a mixture of resins and curing agents to obtain a homogeneous mixture and then grinding the extrudate and screening the product to obtain the desired particle sizes and particle size distribution. The powder is then electrostatically sprayed onto a substrate, traditionally a metal substrate, and cured at high temperatures. The nature of the finish on the substrate was adjusted by the addition of additives.

Metal substrates can be cured at high temperatures as metals are not damaged by such temperatures. The curing of powder coatings on heat sensitive materials such as wood, MDF, plastic and the like is much more of a challenge. It will be clear that materials such as wood cannot be subjected to temperatures of 160° C. or more during a curing reaction as is normal. Such temperatures will destroy the substrate. The present inventors have therefore been looking for powder coating compositions which can be cured at lower temperatures, especially below 140° C., and hence cured at a temperature which does not damage heat sensitive substrates.

A further consideration is extrusion temperature. Any powder coating must be designed not to cure prematurely in the extruder and when a coating is designed to cure at low temperature, it will be clear that curing in an extruder becomes a real concern. The extrusion process can generate enough heat to cure the coating.

A further problem is that low temperature curing is not normally associated with low gloss products. Low gloss products are often desired by the consumer and that is difficult to achieve with low temperature curing.

The present inventors sought not only a powder coating that can be cured at low temperature, but also a powder coating that can give rise to a tailorable finish. In particular, the inventors sought a matt or semi-gloss type finish as opposed to a full gloss type finish.

In the present invention, the inventors have devised a powder coating system which can be cured at low temperatures. In particular, the powder coating system of the invention can be cured using IR radiation in combination with conventional heating. Moreover, this system has the ability to prepare surfaces which can vary from semi-gloss to matt finishes.

The inventors have realised that by using a system in which there are both Lewis acid and Lewis base accelerators present, together with a binder system formed from epoxy and carboxyl components, low temperature curable powder coatings can be prepared. In particular these can be made to have matt to semi-gloss finishes when cured at temperatures ≤140° C.

In this invention, it is preferred if a two component powder coating system is used in which we combine catalysis by Lewis acids and Lewis bases, respectively. This surprisingly results in low temperature curable coatings. The powder coating system can be tuned to gloss levels from matt to semi-gloss and has excellent mechanical properties and scratch and mar resistance.

The inventors have also found, that the powder coating compositions of the invention can be cured using IR radiation in the absence of heat. Such curing is rapid and allows curing to take place on substrates that typically cannot be oven cured, such as large coils and so on.

The use of a Lewis acid or Lewis base as an accelerator/catalyst is not new. These compounds have been used before as catalysts but no one has previously considered there to be an advantage to using both a Lewis acid and Lewis base together.

Some prior art references consider the use of a Lewis base in the context of a self curing powder coating composition, e.g. comprising epoxy resins. EP-A-0806445 describes a self curing epoxy resin using imidazole as a catalyst to give low gloss finishes.

EP-A-0916709 discloses a powder coating which includes a self curing epoxy resin and an imidazole adduct as a catalyst.

The present inventors use a hybrid system which is superior in terms of storage stability and environmental risk than these self curing epoxy systems. Our invention has a higher glass transition temperature and less potentially harmful bisphenol containing epoxy resin. By having less epoxy resin we also reduce yellowness risk (through epoxy oxidation), chalking due to surface degradation (thus providing increased film/material stability) and raw material cost as our carboxyl compounds are cheaper than epoxy resins.

It is an objective for this invention to provide a low temperature cure, variable gloss powder coating. It is a related objective to provide a coating film with excellent mechanical properties and mar and scratch resistance. It is also an objective to provide a powder coating solution that combines reduced gloss and good flow properties. It is another objective of this invention to provide a powder coating system with highly flexible curing schedules. It is also an object of the invention to provide an IR curable coating which is capable of coating large substrates such as industrial coils.

SUMMARY OF THE INVENTION

Viewed from one aspect the invention provides a particulate coating composition, preferably a powder coating composition comprising at least one epoxy containing compound, at least one polycarboxyl polymer, at least one organic Lewis acid and at least one organic Lewis base.

Viewed from another aspect the invention provides a particulate coating composition comprising a blend of two components:

i) a first component comprising at least one epoxy containing compound, at least one polycarboxyl polymer and at least one organic Lewis base; and ii) a second component comprising at least one epoxy containing compound, at least one polycarboxyl polymer and at least one organic Lewis acid.

Viewed from another aspect the invention provides a powder coating composition comprising a blend of two components:

i) a first component comprising at least one epoxy containing compound, at least one polycarboxyl polymer, and at least one organic Lewis base; and ii) a second component comprising at least one epoxy containing compound, at least one polycarboxyl polymer and at least one organic Lewis acid.

Viewed from another aspect the invention provides a process for producing a particulate coating composition, preferably powder coating composition, comprising:

A) separately extruding i) a first component comprising at least one epoxy containing compound, at least one polycarboxyl polymer, and at least one organic Lewis base; and ii) second component comprising at least one epoxy containing compound, at least one polycarboxyl polymer and at least one organic Lewis acid; to form two separate particulates; either B) blending said particulates and milling to form a powder coating; or milling said particulates and blending the milled particulates to form a powder coating.

Viewed from another aspect the invention provides the product of the process as hereinbefore described.

Viewed from another aspect the invention provides a process for coating a substrate comprising coating a substrate with a powder coating as hereinbefore defined, e.g. using electrostatic spraying.

Viewed from another aspect the invention provides a substrate coated with a powder coating as hereinbefore defined.

Viewed from another aspect the invention provides a process for curing a substrate coated with a powder coating as hereinbefore defined comprising exposing said substrate to a temperature of 100 to 160° C. in an oven.

Viewed from another aspect the invention provides a process for curing a substrate coated with a powder coating as hereinbefore defined comprising exposing said substrate to IR radiation.

Viewed from another aspect the invention provides a substrate coated with a cured powder coating as hereinbefore defined.

Viewed from another aspect the invention provides the use of a powder coating as hereinbefore defined in the manufacture of a matt or semi-gloss, cured powder coating.

DETAILED DESCRIPTION OF THE INVENTION

This invention relates to a powder coating composition which can be used to coat a substrate, in particular a heat sensitive substrate. The powder coating composition must contain at least four components: at least one epoxy containing compound, at least one polycarboxyl polymer, at least one organic Lewis acid and at least one organic Lewis base.

Polycarboxyl Polymer

The coating composition of the invention contains at least one polycarboxyl polymer. The term carboxyl is used here to define the presence of the group COOH or a salt thereof. Ideally, the carboxyl group will be in the form of a COOH group. It will be appreciated therefore that an ester group does not constitute a carboxyl group herein.

The polycarboxyl polymer therefore contains a plurality of carboxyl groups. These groups must be capable of reacting with the epoxy groups of the epoxy component and must therefore be available for reaction. That means carboxy groups must be pendant on the molecule and not exclusively in its backbone. Moreover, this component of the powder coating of the invention is a polymer, i.e. is formed from the polymerisation of monomers at least one of which is one containing a carboxyl group It is possible to use a mixture of polycarboxyl polymers or use one polycarboxyl polymer.

In a preferred embodiment, the powder coating of the invention is formed from a two component blend. Whilst it is possible for the same polycarboxyl polymer to be used in both components of the blend, it is preferred if the polycarboxyl polymer used in the first component of that blend is different from the one used in the second component of the blend.

The polycarboxyl polymer is preferably a solid resin containing a plurality of free carboxyl groups. Preferably the polycarboxyl polymer has a Tg above 30° C., more preferably above 40° C. It is preferred if the polycarboxyl polymer comprises at least 5 carboxyl groups, preferably at least 10 carboxyl groups, e.g. at least 20 carboxyl groups. Ideally, the carboxyl resin is characterised in terms of its acid number (AV). Most preferred are carboxyl resins with acid value (AV) between 10-100 mg KOH/g, such as 20 to 90 mg. preferably 25-75 mg KOH/g More preferably, the polycarboxyl polymer is an acid functional polyester, especially one having the AV values above.

Without wishing to be limited by theory it is envisaged that the use of polycarboxyl polymers with a high acid number enhances activity and therefore enables lower curing temperatures and shorter curing times.

The use of carboxyl functional polyesters is preferred especially those designated 50/50 type resins to 80/20 type resins (i.e. where there is 80 wt % carboxy functional polyester is used to 20 wt % epoxy compound of the binders). The value of AV and EEW, discussed below should preferably complement each other. For example, the AV of a 50/50 type resin may be 60 to 80 mg KOH/g. Resins that are defined as 80/20 resins will have lower AV numbers, such as 20 to 40 mg KOH/g.

Other preferred polycarboxyl polymers are polyacids, carboxyl functionalised dendrimers, or carboxyl functionalised acrylic resins. Most preferred are the polyester resins containing a plurality of free carboxyl groups.

The monomers used to form the polyesters of the invention may be based on terephthalic acid, isophthalic acid monomers together with, for example glycols such as neopentyl glycol.

The polycarboxyl polymer is preferably one with a Mw of at least 1000, more preferably at least 2000. The upper Mw value may be 10,000. Preferred Mw values are 2000-6000, preferably 2500 to 5000, such as about 3000. The molecular weights are determined by gel permeation chromatography (GPC) using a polystyrene standard.

Such resins are well known in the art and are sold under the trade names such as Crylcoat, e.g. Crylcoat E 37704, Crylcoat E 38051, Crylcoat E 04314, Crylcoat 1701-1, Uralac P5071, Uralac P3270, Uralac P2450 and so on.

Epoxy Containing Compound

It is also essential to use at least one epoxy containing compound in the composition of the invention, typically an epoxy resin. It is possible to use a mixture of epoxy containing compounds.

In a preferred embodiment, the powder coating of the invention is formed from a two component blend. It is also preferred if the epoxy containing compound used in the first component of the blend of the invention is the same as the one used in the second component of the blend.

The epoxy containing compound is preferably an epoxy resin. Ideally it is a solid resin containing one or more epoxy groups. Suitable resins are again well known in the art and well known commercial products. Epoxy resins include TGIC, Araldite PT 910, bisphenol A based resins, novolac resins, 4,4'-isopropylidenediphenol-epichlorohydrin resins (bisphenol F) based resins, glycidyl methacrylates (GMA) and so on.

In one embodiment of the invention, the epoxy compound is not a glycidyl methacrylate.

Most preferred are solid epoxy resins with an equivalent epoxy weight (EEW) of 300-2000. These resins are often described by their "type". Type 2, 2.5, 3, 4 and novalac type resins are all suitable here. Type 2 resins may have an EEW=550-700, e.g. Epikote resin 1002, Epikote resin 3022-FCA. Type 2.5 resins may have a EEW=600-750, e.g. Araldite GT 6450. Type 3 resins may have EEW=700-850, e.g. Epikote resin 3003, Araldite GT 7004. Type 4 type resins may have EEW=800-1000, e.g. Epikote resin 1055. Novalac type resins may include Epikote resin 2017 or Araldite GT 7255.

It will be appreciated that the epoxy containing compound and carboxyl containing compound need to react in order to cure the coating. Accordingly, it is preferred if these components are mixed in such a ratio that the reactive carboxyl and epoxy groups are within ±25% of stoichiometric ratio. A carboxyl and epoxy ratio within ±10% of stoichiometric ratio is more preferred. A carboxyl and epoxy ratio within ±5% of stoichiometric ratio is most preferred.

The skilled man will be aware that some of the additives discussed below may contain carboxyl groups. When calculating the EEW to AV ratio, account should be taken of the contribution made by any carboxyl groups in the standard additives used in the powder coating. Nevertheless, the presence of a carboxyl resin is essential as the amount of additives present is typically very much lower than the binder content.

For example, the use of a matting additive based on a carboxyl functionalised acrylic polymer is an option in the invention. Where an additive contains a carboxyl group, this needs to be considered as a contributor to the AV value of the composition as a whole.

It will be appreciated therefore that this calculation is based on the total number of carboxyl and epoxy groups present. If compounds contain multiple carboxyl or epoxy groups that must be considered in these calculations that will nevertheless be routine for the skilled chemist.

The combination of the epoxy and polycarboxyl polymer is called the binder system herein. Ideally, the invention employs a hybrid epoxy-carboxyl functional polyester binder system. A different system can be employed in each part of the two component blend.

The amount of epoxy containing compound or polycarboxyl polymer in the powder coating of the invention may be 10 to 90 wt %, preferably 15 to 85 wt %. Typically, the amount of polycarboxyl polymer will be around the same as or exceed that of the epoxy compound.

The total contribution to the powder coating composition from the hybrid epoxy/carboxyl binder system may be up to 100 wt %, e.g. up to 99 wt %, such as 35 to 80 wt % of the composition, e.g. 40 to 70 wt %.

The amount of epoxy containing compound or carboxyl polymer in each component of the two component embodiment of the invention may also be 10 to 90 wt %, preferably 15 to 85 wt %. Typically, the amount of polycarboxyl polymer will be around the same as or exceed that of the epoxy compound.

Lewis Acid

The composition of the invention must contain at least one Lewis acid. Preferably a Lewis acid is present only in component (ii) of the preferred blend of the invention. It is within the scope of the invention for a mixture of Lewis acids to be employed but preferably only one Lewis acid is present.

The term Lewis acid is used herein to define a compound (which cannot be water) which is capable of accepting a pair of electrons. Ideally the Lewis acid is one which is fully or partially soluble in the melted powder.

It is preferred if the Lewis acid is aprotic, i.e. the Lewis acid lacks an acidic hydrogen.

Lewis acids used in this invention are organic and therefore contain carbon. Ideally, the Lewis acid contains both carbon and phosphorus. Moreover, the Lewis acid is ideally a relatively small molecule, with a Mw of less than 1000.

Most preferred are organic phosphonium Lewis acids. Preferably the Lewis acid is of formula $$R_4P^+X^-$$

wherein X is a counter ion such as a halogen ion and each R is independently a $C_{1-12}$ hydrocarbyl group. Preferably each R is independently a $C_{1-6}$ alkyl group or an aryl group such as phenyl. Preferred R groups are methyl, ethyl, n-propyl, isopropyl, n-butyl and phenyl.

Specific examples of preferred Lewis acids include ethyl triphenyl phosphonium bromide, ethyl triphenyl phosphonium chloride, butyl triphenyl phosphonium bromide, and ethyl tributyl phosphonium bromide.

The amount of Lewis acid present in the powder coating of the invention may be 0.1 to 5 wt %.

The amount of Lewis acid present with the second component (ii) of the preferred blend of the invention is 0.1 to 10 wt %, preferably 0.2 to 5 wt %. The amount of Lewis acid within component (i) is preferably zero.

Lewis Base

The Lewis base used in the composition of the invention is organic and therefore comprises carbon. The Lewis base (which cannot be water) is a compound which donates an electron lone-pair. It is preferred if that compound is fully or partially soluble in the melted powder.

The Lewis base is ideally a relatively small molecule, with a Mw of less than 1000.

More preferred are Lewis bases with the lone-pair on a nitrogen atom. Suitable Lewis bases therefore include tertiary amines. More preferably, that nitrogen atom forms part of a ring system. A variety of N-heterocycles can therefore be used as the Lewis base.

Even more preferred are aromatic heterocycles, especially based on nitrogen. Especially preferred are Lewis bases based on imidazoles and pyridines. The use of imidazole based Lewis acids is preferred. Imidazoles of interest include imidazole itself as well as derivatives of imidazole in which one or more ring substituents are present selected from C1-10 hydrocarbyl groups.

Ideally there is only one substituent. Ideally that one substituent is present on the 2-position of the ring. Special examples are 2-methylimidazole, 2-ethylimidazole, 2-isopropylimidazole, imidazole and 2-phenylimidazole, especially 2-methylimidazole and 2-isopropylimidazole.

The use of adducts of imidazoles with epoxy groups is also possible. This enhances the compatibility between the binder and the Lewis base.

The amount of Lewis base present in the powder coating of the invention may be 0.05 to 8 wt %, e.g. 0.1 to 3 wt %.

The amount of Lewis base present within the first component (i) of the preferred blend of the invention may be 0.05 to 8 wt %, e.g. 0.1 to 3 wt %. The Lewis base content in component (ii) is preferably zero.

Two Component System

As noted above, it is preferred if two separate components are made for blending in order to provide the powder coating of the invention. The first contains at least a Lewis base, carboxyl and epoxy compounds. This should be free of phosphonium groups. Ideally it will be free of Lewis acids therefore.

The second component of the blend contains at least Lewis acid, carboxyl and epoxy compounds. This second component is preferably free of imidazole type Lewis bases. Ideally therefore this component is free of Lewis base.

The invention covers a kit of parts comprising these two components prior to mixing as well as a blend of these two components after mixing.

The ingredients of each component of the blend can be mixed (separately) and extruded to form particles as is known in the art. These particles can then be milled to form powder. It is important that the extrusion of each component of the blend takes place separately. We have found that if the Lewis acid and Lewis base are present in the same composition before extrusion, the matt effect which is a preferred feature of the invention cannot be achieved in the resulting cured coating. Also, the mechanical properties of a composition in which both Lewis acid and Lewis base are extruded together are less favourable. Nevertheless, the combined extrudate enables the formation of glossy coatings which can be cured at low temperatures.

To realise some of the improved properties discussed further below therefore, it is necessary to extrude the two components separately. When that occurs, it will be appreciated that the particulate which forms after extrusion and subsequent powder formed after milling is nominally made from individual particles which contain either Lewis acid or Lewis base.

The blending of the two components preferably takes place after extrusion and not before. Blending can take place before milling or after milling but each component of the blend should be extruded separately.

A preferred mixing ratio of the two components (i and ii) is between 99:1 and 1:99% by weight, e.g. 10:90 to 90:10 wt %. More preferred is a mixing ratio of the two components between 25:75 and 75:25% by weight. Most preferred is a mixing ratio of the two components between 40:60 and 60:40% by weight. Ideally, the mixing ratio is around 1:1 by wt.

In order to ensure homogeneity before extrusion, the components of each blend must be well mixed. Any type of high speed mixer can be used. All industrial extruders are suitable for powder preparation. It is preferred to keep the extrudate temperature below 140° C. to prevent premature curing. More preferably, the temperature should be kept below 120° C. during extrusion. This can be achieved by adjusting appropriate extruder settings.

The extruded granulates can be milled by all types of conventional mills and the particles thereafter classified by a method of choice, to a particle size found most suitable for powder application. The particle size distribution of the powder coating composition may be in the range of from 0 to 120 microns with a mean particle size in the range of from 15 to 75 microns, preferably at least 20 or 25 microns, advantageously not exceeding 50 microns, more especially 20 to 45 microns.

As the combination of Lewis acid and Lewis base provided via separate blend components provides, inter alia, lower gloss, it is clear that this solution offers a synergy, perhaps it terms of more efficient cross-binding.

Additives

It will also be appreciated that the powder coatings of the invention may contain a wide variety of standard industry additives. Additives of use include gloss modifiers, scratch resistors, pigments, fillers, degassing additives, flow improvers, waxes, antioxidants, optical brighteners and surface modifying agents. These additives in total can generally form up to about 60 wt % of the powder coating, e.g. up to 40 wt %.

The use of gloss modifiers is particularly preferred, in particular matting agents that reduce gloss. The preferred gloss modifier in the powder formulation is an acrylic polymer. More preferred is a carboxyl-functionalised acrylic polymer. Most preferred is a carboxyl functionalised acrylic polymer with AV 100-300 mg KOH/g. This modifier acts as a matting agent.

Preferred pigments and fillers are inorganic minerals such as titanium dioxide, talc, calcium carbonate, organic pigments and so on.

These additives can be added to one or each component of the two component blend before extrusion. The additive package added to each component of the blend can, of course, differ. For example, it may be necessary to add a gloss modifier to only one component of the blend.

It will be appreciated that the powder coating of the invention must be dry and free of water.

Texturing Agents

The inventors have additionally found that a coating as hereinbefore defined can be modified by the use of texturing agents to achieve new types of finish in the context of textured coatings. In particular, the inventors can achieve low sheen surfaces, i.e. surfaces with low gloss at low observational angles. Furthermore, it is of interest to prepare low sheen coatings for low temperature curing (LTC) which also have good mechanical properties and scratch resistance.

Currently, textured coatings have high sheen as textured coatings are typically medium to high gloss coatings to which a texturing agent has been added. Traditionally, there is no or little matting in textured coatings, and the topography is still medium to high gloss. This results in high gloss when the surface is observed at low angles. This feature is not appealing for many areas of use, and a simple solution to this is sought.

The coating system described herein can be cured at low temperatures and, upon the addition of texturing agents, results in low sheen textured surfaces.

Additionally, the cured textured coating has a surface with "soft-touch properties", i.e. a feeling of warmth and a smooth feeling resembling fabric or leather.

The texturing agents added are conventional in the art but the combination of these texturing agents with the low temperature curable powder coatings of the invention gives rise to a further interesting combination which forms a still yet further aspect of the invention.

Thus, viewed from another aspect the invention provides a particulate coating composition, preferably a powder coating composition, comprising at least one epoxy containing compound, at least one polycarboxyl polymer, at least one organic Lewis acid and at least one organic Lewis base; and at least one texturing agent.

Alternatively viewed, the invention provides a particulate coating composition comprising a blend of two components:

i) a first component comprising at least one epoxy containing compound, at least one polycarboxyl polymer, and at least one organic Lewis base and optionally a texturing agent; and ii) a second component comprising at least one epoxy containing compound, at least one polycarboxyl polymer and at least one organic Lewis acid and optionally a texturing agent;

wherein at least one of components (i) or (ii) comprises a texturing agent.

The low sheen is achieved by combining matting and texturing in one formulation, thus ensuring that the coated surface reflects less light. Surfaces coated with textured coatings of the invention may have gloss values measured at an angle of 20° which are the same (to within +/−2 percentage points) as gloss values measured at an angle of 60°.

The surfaces resulting from these formulations also have low friction.

The texturing agent can be added to either or both of the components used to form the powder coating of the invention. It is preferred if the texturing agent is added to one component of the powder coating only.

Texturing agents of use in the invention are not limited. Preferred options are polytetrafluoroethylene (PTFE) waxes, mixed PTFE waxes, cellulose acetate butyrate (CAB), functionalised bentone clays, polytetrafluoroethylene/polyethylene (PTFE/PE) waxes.

The roughness of the textured coating can be varied by adjusting the amount of texturing agents present or by adding other additives. Typical amounts of texturing agent in the coating as a whole may be between 0.01 and 2 wt %, such as 0.05 to 1 wt %, preferably 0.1 to 0.5 wt %. The amounts in each individual component of the blend should be selected so as to provide this level of final texturing agent content in the coating as a whole.

Application to Substrates

The powder coating of the invention can be applied to a substrate by any conventional powder coating method such as spraying, e.g. electrostatically. The use of triboelectric guns can also be used. Coating techniques are well known in the art and will be familiar to the skilled man. The coating composition may be used as a primer or as a top coat. It may be used alone (i.e. as a single layer) or form part of a multilayer coating. Preferably, it is the top layer employed, especially if a matt finish is desired.

Substrate

The substrate onto which the powder coatings of the invention should be applied can be any substrate such as a metal substrate but is preferably a substrate that is heat sensitive. Such substrates are those that cannot be exposed to temperatures greater than 160° C., preferably cannot be exposed to temperatures greater than 140° C. without being damaged. Substrates of main interest therefore include wood, MDF, HDF, plywood, fibreboard, particleboard, plastic and so on. Substrates for internal or external use are envisaged.

The powder coating of the invention may therefore be used in coating glass, ceramics, and graphite-filled composites as well as metallic substrates such as steel and aluminum but has particular utility in the coating of heat sensitive substrates such as plastics, paper, cardboard and wood. This makes it highly appealing as a commercially viable alternative to the liquid coatings that have been almost universally used in the past.

For the purposes of this invention, wood is defined as any lignocellulosic material whether it comes from trees or other plants and whether it be in its natural forms, shaped in a saw mill, separated into sheets and made into plywood, or chipped and made into particleboard, or its fibers have been separated, felted, and compressed. It is exemplified by lumber, panels, molding, siding, oriented strand board, hardboard, medium density fiberboard, and the like Curing Once a substrate is coated with the powder coating, the coating must be cured. The coated substrate may be cured in a conventional convection oven or an IR/convection combination oven. It is also possible to use inductive heating. The use of a convection/induction oven or even convection/induction/IR oven is also contemplated. It is preferred if the curing schedule at least partially includes an IR-curing step. The use of a combination of heat and IR curing is preferred.

Where heating is used during cure, the temperature should preferably be in the range of 100 to 160° C., e.g. 110 to 140° C. The use of these curing conditions in combination with the powder coatings of the invention allows low temperature curing to place and enables the formation of semi-gloss and matt finishes. It has been surprisingly found where IR is used to cure the coating in combination with heat, lower gloss values are observed than in purely oven cured materials. This allows the formation of finishes of low gloss.

It has also been surprisingly found that the powder coatings of the invention can be cured by IR radiation optionally in the absence of conventional heating. The fact that the substrate of the invention can be cured by irradiation opens up enormous possibilities in terms of the substrates to be coated. As we do not need to employ an heating oven, substrates such as coils become available here. The use of the powder coating of the invention to powder coat a coil forms a further aspect of the invention. Coils coated with our powder coating form a still yet further aspect.

The IR curing process is fast making this an attractive commercial process. Moreover, any type of finish can be developed using IR curing.

It is preferred if the IR-curing process involves IR-irradiation of wavelengths between 1-20 μm.

A preferred curing schedule involves an initial boost by IR-heating which results in melting of the powder and flow of the film at elevated temperature. Secondary heating in a convection-oven ensures the full curing of the film, and allows lower oven temperatures (110-140° C.). The short, high temperature IR-boost does not result in elevated object temperatures in non-conducting materials and materials with low thermal conductivity, and thus allows the use of alternative substrates as e.g. wood, plastics, particleboard, etc.

A further benefit of the invention is short curing cycles. The powder coating of the invention can be cured using short curing cycles, e.g. of 15 minutes or less. This is despite lower heating temperatures. Where IR radiation is used alone, curing times can be less than 10 minutes.

The powder coating is preferably free flowing during the curing operation and therefore this leads to smooth, even finishes.

The film thickness of the cured coating is preferably at least 0.01 mm, e.g. 0.05 to 0.2 mm.

As noted above, an important and preferred property of the cured powder coatings compositions of the invention is their gloss properties. The gloss range of the cured paint composition is preferably from 8-60% (at 60° observation), preferably 20 to 40%. It is highly preferred if the cured powder coating of the invention has a matt appearance. This can be achieved without the aid of a matt inducing additive. By matt is meant a gloss of less than 40% (at 60° observation). By semi-gloss is meant a gloss less than 60°.

In the invention, the gloss is easily varied between 60 and 8 (at 60° observation angle, according to EN ISO 2813) by adjusting the amounts of additives present and by varying the cure conditions. The nature of the Lewis acids/bases and binder resin also affects the gloss.

Gloss reduction through the use of special hardeners or mixing of non-compatible powders are the traditional methods to obtain films with matte or semi-gloss finishes. However, these methods fail to give the desired effects at lower curing temperatures, and/or the mechanical properties of the films are severely impaired. The present invention solves that problem.

It is also a feature of the invention that the cure powder coating of the invention is smooth. The smoothness of the coating film is judged visually to 6 and above on the PCI-scale (Powder Coating Institute).

Smooth finishes and good mar and scratch resistance are also difficult to achieve with low temperature cured systems. Due to their fast curing rates, the flow window is narrow, and the resulting films are wrinkled or uneven. Insufficient cross-linking also results in poor resistance to mar and scratching.

The cured films also show superior mechanical properties and have good flexibility and scratch, mar, and chemical resistance. Preferably, the film is not penetrable to moisture or liquids on any tested surface tension in the range from 20-70 mN/m.

The impact resistance of the cured powder coating is preferably at least 80 in/lbs, especially at least 100 in/lbs.

Glass transition temperatures of the powder coating can be at least 30° C., such as 40 to 70° C. The glass transition temperature of the cured film may be 50 to 100° C., preferably 60 to 80° C.

Post Treatment

Once the cured coating has been formed. It can be subjected to various post treatments to enhance its appearance, in particular to decorate the surface. Consumers like coatings to have a wood effect and the inventors have found that such an effect can be achieved on this case by the use of sublimation ink transfer.

Sublimation ink transfer is a printing process that uses heat to transfer dye onto the cured surface. Alternative post treatments include screen printing.

The invention will now be described with reference to the following non limiting examples.

Analytical Methods

Film Thickness:
Measured according to ISO 2178 for metallic substrates, and ASTM D4138-A for non-metallic substrates.

Gloss:
Measured according to DIN 67530.

Impact Resistance:
Measured according to ASTM D 2794 at 70 μm film thickness.

Determination of the Glass Transition Temperature
The glass transition temperature (Tg) is obtained by Differential Scanning calorimetry (DSC) measurements. The DSC measurements were performed on a Metler Toledo DSC 823E instrument. 10 mg dry material were measured in open aluminum pans and scans were recorded at a heating and cooling rate of 20° C./min with an empty pan as reference. The onset value of the glass transition of the second heating is reported as the Tg of the materials.

MEK Test:
This is a test of solvent resistance, used to determine the degree of curing of the film. A cotton stick is wetted with methyl ethyl ketone (MEK) and rubbed across the cured film with a slight pressure (rub-length is approximately 10 cm). After 30 double rubs, the surface is checked by visual inspection, and change in hardness is assessed by scratching the surface with a finger nail. Results are reported in the following way;
A0=No change of gloss. No softening (no scratch from finger nail).
A1=Slight loss of gloss. No softening.
A2=Slight loss of gloss. Some softening (can be scratched by finger nail).
A3=Strong reduction in gloss. Softening (easily scratched by finger nail).
A4=Strong reduction in gloss. Strong softening (coating partially removed).
A5=Coating removed down to substrate.

Gel Time:
Measured according to ISO8130.

Adhesion:
Measured according to ISO 2409

EEW: Measured according to ASTM D-1652

Acid Value (AV): Measured according to ASTM D974

EXAMPLES

General Protocols

Preparation of Powder:
The weighed out components are added to a high speed mixer in order to ensure sufficient dispersion of the powder pre-mix. The pre-mix is then added to an Theysohn TSK 20-24 twin-screw extruder and extruded under the following conditions: 30° C. in the feed zone, 50° C. in the middle, 100° C. at the head at 500 rpm.

The extruded material was fed to a chilled roll and passed through a crusher, reducing the chilled material to flakes. The crushed flakes were then fed to a mill. The extruded chips are milled in a mill and sieved in order to ensure a particle size distribution (PSD) within defined specifications. Mixing of the two components was performed either as flakes (prior to milling) or by mixing of milled powder.

Mill:
Hosokawa Micropul ACM 30 mill Sieved through a 125 μm rotation sieve.

Particle size distribution: powders were produced to ensure a mean particle size ($d_{50}$) of 25-50 μm.

Application of Powder to Substrate
The powder was applied to the substrates using standard corona or tribo air-guns. Substrates were either hanging in metal wires or suspended on a suitable stand. The substrates used are mentioned in the tables (CRS—cold rolled steel) or MDF.

Curing of Films
Substrates coated with powder were cured in two different types of oven.
 A) Conventional heat transfer by convection.
    Curing temperatures were varied between 130-180° C. object temperature, with curing times of 3-15 minutes at object temperature, dependent on the precise powder formulation.
    Oven: Heraeus conventional benchtop oven.
 B) Infrared/convection combination oven
    Curing temperatures were varied between 110-150° C. object temperature, with curing times of 5-15 minutes at object temperature, depending on the precise powder formulation. Infrared heating was used as an initial IR-boost, to ensure melting and flow of the film prior to curing by convection heating. Precise curing schedule, conveyor speed and oven times are dependent on the individual experiments.
    Oven: Triab IR/convection combination cure oven.

Comparative Example 1

No Lewis Base

| Ingredients | Amount [kg] | Curing conditions | Test | Result |
|---|---|---|---|---|
| 50/50 type carboxy functionalised saturated polyester (PE) (66-74 mg KOH/g) | 0.320 | Temp. 140° C. | Gloss (60°) [%] | 95 |
| Ethyl-triphenylphosphonium Bromide (EtPBr) | 0.0073 | Time 10 min. | Impact resistance [inch, lbs] ([J]) | |
| Epoxy of EEW 590-630 | 0.240 | Convection oven | Front | 160 (18.1) |
| Acrylic anti-cratering agent | 0.010 | Cold rolled steel (CRS) | Reverse | 160 (18.1) |
| Degassing agent | 0.003 | | MEK test | A2 |
| TiO$_2$ pigment | 0.250 | | | |
| Total | 0.857 | | Tg (powder) [° C.] | 52 |
| | | | Gel time (140/200° C.) [s] | —/15 |

The gloss of this paint is very high.

Comparative Example 2

No Lewis Base but Matting Additive Present

| Ingredients | Amount [kg] | Curing | Test | Result |
|---|---|---|---|---|
| 50/50 type PE | 0.320 | Temp. 140° C. | Gloss (60°) [%] | 96 |
| EtPBr | 0.0073 | Time 10 min. | Impact resistance [inch, lbs] ([J]) | |
| Epoxy EEW 590-630 | 0.360 | Convection oven | Front | 60 (6.8) |
| Acrylic anti-cratering agent | 0.010 | CRS | Reverse | 20 (2.6) |
| Degassing agent | 0.003 | | MEK test | A3 |
| TiO$_2$ pigment | 0.250 | | | |
| Carboxyl functional acrylic polymer | 0.060 | | Tg (powder) [° C.] | 49 |
| | | | Gel time (140/200° C.) [s] | —/21 |

Gloss is still very high—addition of matting additive ineffective. Mechanical properties poor.

Comparable Example 3

No Lewis Acid but Matting Additive Present

| Ingredients | Amount [kg] | Curing | Test | Result |
|---|---|---|---|---|
| 70/30 type PE (32-40 mg KOH/g) | 0.330 | Temp. 150° C. | Gloss (60°) [%] | 46 |
| Epoxy of EEW 590-630 | 0.279 | Time 10 min. | Impact resistance [inch, lbs] ([J]) | |
| Carboxyl functional acrylic polymer | 0.091 | Convection oven | Front | 20 (2.6) |
| 2-isopropyl-imidazole | 0.00425 | CRS | Reverse | 20 (2.6) |
| Acrylic anti-cratering agent | 0.010 | | MEK test | A3 |
| Degassing agent | 0.002 | | | |
| TiO$_2$ pigment | 0.300 | | Tg (powder) [° C.] | 48 |
| | | | Tg (film) [° C.] | 70.66 |
| | | | Gel time (140/200° C.) [s] | >200/24 |

Gloss remains high and the mechanical properties are very poor.

Example 4

Of the Invention

| Ingredients | Amount [kg] A | Amount [kg] B | Curing | Test | Result |
|---|---|---|---|---|---|
| 70/30 type PE | — | 0.330 | Temp. 150° C. | Gloss (60°) [%] | 55 |
| Carboxyl functional acrylic polymer | — | 0.091 | Time 10 min. | Impact resistance [inch, lbs] ([J]) | |
| 2-isopropylimidazole | — | 0.00425 | Convection oven | Front | 140 (15.8) |

-continued

| Ingredients | Amount [kg] A | Amount [kg] B | Curing | Test | Result |
|---|---|---|---|---|---|
| Acrylic anti-cratering agent | 0.010 | 0.010 | CRS | Reverse | 140 (15.8) |
| Degassing agent | 0.002 | 0.002 | | MEK test | A2 |
| TiO$_2$ pigment | 0.250 | 0.300 | | | |
| Polypropylene wax | 0.013 | 0.014 | | Tg (powder) [° C.] | 50 |
| 50/50 type PE | 0.320 | — | | Tg (film) [° C.] | 69.54 |
| Epoxy of EEW 590-630 | 0.240 | 0.279 | | Gel time (140/200° C.) [s] | 185/28 |
| EtPBr | 0.0073 | — | | | |
| | | | Temp 140° C. Time 8 min. IR/convection MDF | Gloss (60°) [%] | 33 |

Comments: The components A and B were mixed in a one to one weight ratio after milling and sieving. Curing was carried out under two alternative protocols. When the IR curing was present, gloss falls dramatically.

Example 5

Of the Invention

| Ingredients | Amount [kg] C | Amount [kg] D | Curing | Test | Result |
|---|---|---|---|---|---|
| 70/30 type PE | — | 0.330 | Temp. 150° C. | Gloss (60°) [%] | 49 |
| Carboxyl functional acrylic polymer | — | 0.091 | Time 10 min. | Impact resistance [inch, lbs] ([J]) | |
| 2-isopropylimidazole | — | 0.00425 | Convection oven | Front | 120 (13.6) |
| Acrylic anti-cratering agent | 0.010 | 0.010 | CRS | Reverse | 120 (13.6) |
| Degassing agent | 0.002 | 0.002 | | MEK test | A2 |
| TiO$_2$ pigment | 0.300 | 0.300 | | Tg (powder) [° C.] | 51 |
| Polypropylene wax | 0.035 | 0.035 | | | |
| 50/50 type PE | 0.336 | — | | Tg (film) [° C.] | 71 |
| Epoxy of EEW 590-630 | 0.284 | 0.279 | | Gel time (140/200° C.) [s] | 196/25 |
| EtPBr | 0.0081 | — | | | |
| | | | Temp 140° C. Time 8 min. | Gloss (60°) [%] | 33 |
| | | | | Cross Hatch (adhesion) | 0 |
| | | | IR/convection MDF | MEK test | A2 |

Comments: The components A and B were mixed in a one to one weight ratio after milling and sieving. Curing was carried out under two alternative protocols. When the IR curing was present, gloss falls dramatically.

Example 6

Of the Invention

The composition of example 5 was used again but cured under different conditions. Curing schedules on MDF in IR/convection oven:

| Curing | Test | Result | Curing | Test | Result |
|---|---|---|---|---|---|
| Temp 140° C. | Gloss (60°) | 33 | Temp 125° C. | Gloss (60°) [%] | 33 |
| Time 8 min. | Cross Hatch (adhesion) | 0 | Time 15 min. | Cross Hatch (adhesion) | 0 |
| IR/convection MDF | MEK test | A2 | IR/convection MDF | MEK test | A2 |
| Temp 130° C. | Gloss (60°) | 27 | Temp 120° C. | Gloss (60°) [%] | 34 |
| Time 8 min. | Cross Hatch (adhesion) | 0 | Time 15 min. | Cross Hatch (adhesion) | 0 |
| IR/convection MDF | MEK test | A2 | IR/convection MDF | MEK test | A3 |

In the presence of IR therefore, the gloss falls dramatically.

Example 7

Of the Invention

| Ingredients | Amount [kg] C | Amount [kg] D | Curing | Test | Result |
|---|---|---|---|---|---|
| 70/30 type PE | — | 0.330 | Temp. 150° C. | Gloss (60°) [%] | 52 |
| Carboxyl functional acrylic polymer | — | 0.091 | Time 10 min. | Impact resistance [inch, lbs] ([J]) | |
| 2-isopropylimidazole | — | 0.00425 | Convection oven | Front | 120 (13.6) |
| Acrylic anti-cratering agent | 0.010 | 0.010 | CRS | Reverse | 120 (13.6) |
| Degassing agent | 0.002 | 0.002 | | MEK test | A2 |
| $TiO_2$ pigment | 0.300 | 0.300 | | | |
| Polypropylene wax | 0.035 | 0.035 | Temp 140° C. | Gloss (60°) [%] | 30 |
| 50/50 type PE | 0.336 | — | Time 8 min. | Cross Hatch (adhesion) | 0 |
| Epoxy of EEW 590-630 | 0.284 | 0.279 | IR/convection | MEK test | A2 |
| EtPBr | 0.0081 | — | MDF | | |

Comments: The granulates of extruded components C and D were mixed in a one to one weight ratio prior to milling and sieving. Curing was carried out under two alternative protocols. When the IR curing was present, gloss falls dramatically.

Example 8

| Ingredients | Amount [kg] C | Amount [kg] D | Curing | Test | Result |
|---|---|---|---|---|---|
| 70/30 type PE | — | 0.330 | Temp. 150° C. | Gloss (60°) [%] | 92 |
| Carboxyl functional acrylic polymer | — | 0.091 | Time 10 min. | Impact resistance [inch, lbs] ([J]) | |
| 2-isopropylimidazole | — | 0.00425 | Convection oven | Front | 40 (4.5) |
| Acrylic anti-cratering agent | 0.010 | 0.010 | CRS | Reverse | 40 (4.5) |
| Degassing agent | 0.002 | 0.002 | | MEK test | A3-A4 |
| $TiO_2$ pigment | 0.300 | 0.300 | | | |
| Polypropylene wax | 0.035 | 0.035 | | | |
| 50/50 type PE | 0.336 | — | | | |
| Epoxy of EEW 590-630 | 0.284 | 0.279 | | | |
| EtPBr | 0.0081 | — | | | |

Comments: The granulates of components C and D were mixed and co-extruded prior to final milling and sieving. As can be seen, gloss goes up.

Films formed from either of the components of the two component blend alone therefore fail to give gloss reduction beyond semi-gloss, at best. In addition, mechanical properties, flow, and curing are impaired. Neither of the components were fully cured at the target temperature. Co-extrusion of the two components results in high gloss films.

Example 9

Of the Invention

| Ingredients | Amount [kg] E | Amount [kg] F | Curing | Test | Result |
|---|---|---|---|---|---|
| 70/30 type PE | — | 3.234 | Temp. 140° C. | Gloss (60°) [%] | 47 |
| Carboxyl functional acrylic polymer | — | 0.892 | Time 10 min. | Impact resistance [inch, lbs] ([J]) | |

-continued

| Ingredients | Amount [kg] E | F | Curing | Test | Result |
|---|---|---|---|---|---|
| 2-isopropylimidazole | — | 0.0415 | Convection oven | Front | 120 (13.6) |
| Acrylic anti-cratering agent | 0.098 | 0.098 | CRS | Reverse | 120 (13.6) |
| Degassing agent | 0.040 | 0.040 | | MEK test | A2 |
| TiO$_2$ pigment | 1.625 | 1.625 | | | |
| Polypropylene wax | 0.343 | 0.343 | | Gel time (140/200° C.) [s] | 196/25 |
| Inorganic filler | 1.300 | 1.300 | | | |
| 50/50 type PE | 3.293 | — | | | |
| Epoxy of EEW 590-630 | 2.780 | 2.734 | | | |
| EtPBr | 0.0794 | — | Temp 140° C. | Gloss (60°) [%] | 25 |
| Organic pigment I | 0.055 | 0.055 | Time 8 min. | Cross Hatch (adhesion) | 0 |
| Organic pigment II | 0.130 | 0.130 | IR/convection | MEK test | A2 |
| Organic pigment III | 0.006 | 0.006 | MDF | | |

The granulates of extruded components C and D were mixed in a one to one weight ratio prior to milling and sieving. Curing was carried out under two alternative protocols. When the IR curing was present, gloss falls dramatically.

Example 10

Of the Invention

| Ingredients | Amount [kg] G | H | Curing | Test | Result |
|---|---|---|---|---|---|
| 70/30 type PE | — | 0.330 | Temp. 140° C. | Gloss (60°) [%] | 53 |
| Carboxyl functional acrylic polymer | — | 0.091 | Time 10 min. | | |
| 2-isopropylimidazole | — | 0.00425 | Convection oven | Gel time (140/200° C.) [s] | 228/24 |
| Acrylic anti-cratering agent | 0.010 | 0.010 | CRS | | |
| Degassing agent | 0.002 | 0.002 | Temp 140° C. | Gloss (60°) [%] | 47 |
| TiO$_2$ pigment | 0.300 | 0.300 | Time 8 min. | MEK test | A2 |
| Polypropylene wax | 0.0175 | 0.0175 | IR/convection | | |
| 50/50 type PE | 0.336 | — | MDF | | |
| Epoxy of EEW 590-630 | 0.284 | 0.279 | | | |
| EtPBr | 0.0081 | — | | | |

Comments: The components were mixed in a one to one weight ratio after milling and sieving. Curing was carried out under two alternative protocols. When the IR curing was present, gloss falls.

Example 11

Of the Invention

| Ingredients | Amount [kg] I | J | Curing | Test | Result |
|---|---|---|---|---|---|
| 70/30 type PE | — | 0.156 | Temp. 140° C. | Gloss (60°) [%] | 18 |
| Carboxyl functional acrylic polymer | — | 0.182 | Time 10 min. | Impact resistance [inch, lbs] ([J]) | |
| 2-isopropylimidazole | — | 0.0085 | Convection oven | Front | 80 (9.0) |

-continued

| Ingredients | Amount [kg] I | Amount [kg] J | Curing | Test | Result |
|---|---|---|---|---|---|
| Acrylic anti-cratering agent | 0.010 | 0.010 | CRS | Reverse | 80 (9.0) |
| Degassing agent | 0.002 | 0.002 | | | |
| TiO$_2$ pigment | 0.300 | 0.300 | | Tg (powder) [° C.] | 47 |
| Polypropylene wax | 0.035 | 0.035 | | Tg (film) [° C.] | 70 |
| 50/50 type PE | 0.336 | — | | Gel time (140/200° C.) [s] | 181/21 |
| Epoxy of EEW 590-630 | 0.284 | 0.362 | | | |
| EtPBr | 0.0081 | — | | | |
| | | | Temp 140° C. Time 8 min. | Gloss (60°) [%] | 15 |
| | | | | Cross Hatch (adhesion) | 0 |
| | | | IR/convection MDF | MEK test | A2 |

Comments: The components were mixed in a one to one ratio after milling and sieving. Curing was carried out under two alternative protocols. When the IR curing was present, gloss falls.

Example 12

Of the Invention

| Ingredients | Amount [kg] K | Amount [kg] L | Curing | Test | Result |
|---|---|---|---|---|---|
| 70/30 type PE | — | 0.503 | Temp. 140° C. | Gloss (60°) [%] | 55 |
| 2-isopropylimidazole | — | 0.00425 | Time 10 min. | Impact resistance [inch, lbs] ([J]) | |
| Acrylic anti-cratering agent | 0.010 | 0.010 | Convection oven | Front | 160 (18.1) |
| Degassing agent | 0.002 | 0.002 | CRS | Reverse | 160 (18.1) |
| TiO$_2$ pigment | 0.300 | 0.300 | | MEK test | A3-A2 |
| 50/50 type PE | 0.336 | — | | | |
| Epoxy of EEW 590-630 | 0.284 | 0.197 | | Tg (powder) [° C.] | 51 |
| EtPBr | 0.0081 | — | | Tg (film) [° C.] | 71 |
| | | | | Gel time (140/200° C.) [s] | 180/25 |
| | | | Temp 140° C. Time 8 min. | Gloss (60°) [%] | 42 |
| | | | | Cross Hatch (adhesion) | 0 |
| | | | IR/convection MDF | MEK test | A3-A4 |

Comments: The components were mixed in a one to one weight ratio after milling and sieving. Curing was carried out under two alternative protocols. When the IR curing was present, gloss falls dramatically.

Example 13

Of the Invention

| Two-component system | A | B | C | D | 1 | 2 | 3 | 4 |
|---|---|---|---|---|---|---|---|---|
| 70/30 type PE [kg] | — | 0.335 | — | 0.335 | | | | |
| 50/50 type PE [kg] | 0.336 | — | 0.336 | — | | | | |
| Epoxy of EEW 590-630 [kg] | 0.284 | 0.274 | 0.284 | 0.274 | | | | |
| Acrylic PE [kg] | — | 0.091 | — | 0.091 | | | | |
| 2-isopropylimidazole [kg] | — | 0.0085 | — | 0.0085 | | | | |
| EtBPr [kg] | 0.081 | — | 0.081 | — | | | | |
| Flow agent [kg] | 0.009 | 0.009 | 0.009 | 0.009 | | | | |

-continued

| Two-component system | A | B | C | D | 1 | 2 | 3 | 4 |
|---|---|---|---|---|---|---|---|---|
| Polypropylene wax [kg] (scratch/gloss modifier) | 0.035 | 0.035 | 0.035 | 0.035 | | | | |
| PTFE/polyethylene wax [kg] (texturing agent) | 0.007 | 0.007 | — | — | | | | |
| Titanium oxide [kg] | 0.300 | 0.300 | 0.300 | 0.300 | | | | |
| Powder A [kg] | | | | | 1 | 1 | 1 | — |
| Powder B [kg] | | | | | 1 | 1 | — | 1 |
| Powder C [kg] | | | | | — | — | — | 1 |
| Powder D [kg] | | | | | — | — | 1 | — |
| Substrate | | | | CRS Curing at 140° C. for 10 min. | | | | |
| Sieve [µm] | | | | | 80 | 125 | 80 | 80 |
| Film thickness [µm] | | | | | 60–100 | 60–100 | 40–70 | 40–70 |
| Gloss (angle 60°/20°) [%] | | | | | 8/9 | 8/9 | 15/15 | 20/20 |
| Impact resistance (inch. lbs.) | | | | | | | | |
| Front | | | | | 100 | 100 | 60 | 60 |
| Reverse | | | | | 100 | 100 | 40 | 40 |
| MEK test | | | | | A2 | A2 | A2–A3 | A2–A3 |
| Tg (powder) [° C.] | | | | | 50 | 50 | — | — |
| Tg (film) [° C.] | | | | | 72 | 72 | — | — |
| Gel time (140/200° C.) [s] | | | | | 170/11 | 170/11 | 168/16 | 166/16 |
| Substrate | | | | MDF Curing at 140° C. for 8 min. | | | | |
| Gloss (angle 60°/20°) [%] | | | | | 7/8 | 7/8 | 16/16 | 16/16 |
| MEK test | | | | | A2 | A2 | A2–A3 | A2–A3 |

The presence of the texturing agent allows the formation of substrates with low sheen. This can be seen as the gloss at 20° is the same as the gloss at 60°. Despite therefore the gloss being observed at a much lower observational angle, the gloss remains low.

Example 14

Post Treatment

A coating formulation with texturing agents as described in example 13 was prepared and applied to MDF panels. The coated panels were wrapped in plastic foil coated with a transferrable ink and inserted into a sublimation apparatus. To ensure proper contact of the plastic film on the coated panel, the system was evacuated. The panel was then heated to 200° C. for 5 minutes before being cooled down. Upon removal of the plastic film, the imprinted panel was obtained successfully.

The printing was performed by a Menphis Hot press.

The invention claimed is:

1. A process for producing a particulate coating composition comprising:
   mixing and extruding: at least one first epoxy containing compound, at least one first polycarboxyl polymer, and at least one organic Lewis base, to form a first particulate component free of Lewis acid;
   separately mixing and extruding: at least one second epoxy containing compound, at least one second polycarboxyl polymer, and at least one organic Lewis acid, to form a second particulate component free of Lewis base; and
   combining the first and second particulate components to form the particulate coating composition, wherein said combining is accomplished by either: blending the first and second particulate components and subsequently milling said blend; or individually milling the first and second particulate components and subsequently blending said individually milled first and second particulate components.

2. The process of claim 1, wherein the particulate coating composition is a powder coating composition.

3. A particulate coating composition produced by the process of claim 1.

4. The particulate coating composition of claim 3 wherein said at least one first polycarboxyl polymer and said at least one second polycarboxyl polymer are carboxy functional polyesters.

5. The particulate coating composition of claim 3 wherein said at least one first polycarboxyl polymer and said at least one second polycarboxyl polymer have an acid value AV of 20 to 80 mg KOH/g.

6. The particulate coating composition of claim 3, wherein said at least one first polycarboxyl polymer and said at least one second polycarboxyl polymer are different polymers.

7. The particulate coating composition of claim 3 wherein said at least one organic Lewis acid is an organic phosphonium compound.

8. The particulate coating composition of claim 3 wherein said at least one organic Lewis base is a N-heterocyclic compound.

9. The particulate coating composition of claim 8, wherein said N-heterocyclic compound is an imidazole.

10. The particulate coating composition of claim 3 further comprising a texturing agent.

11. The particulate coating composition of claim 3, wherein the particulate coating composition is a powder coating composition.

12. A substrate coated with the particulate coating composition of claim 3.

13. A process for coating a substrate comprising coating a substrate with the particulate coating composition of claim 3.

14. The process of claim 13 further comprising exposing said coated substrate to a temperature of 100 to 160° C. in an oven, to cure said coating.

15. The process of claim 13 further comprising exposing said coated substrate to IR radiation, to cure said coating.

16. A coated substrate produced by the process of claim 14 or the process of claim 14, wherein the cured coating has a matte finish.

17. The coated substrate of claim 16 wherein the coated substrate is subjected to post treatment by sublimation ink transfer.

18. The process of claim 13, wherein the substrate is coated with the particulate coating composition by electrostatic spraying.

* * * * *